United States Patent Office 3,211,303
Patented Oct. 12, 1965

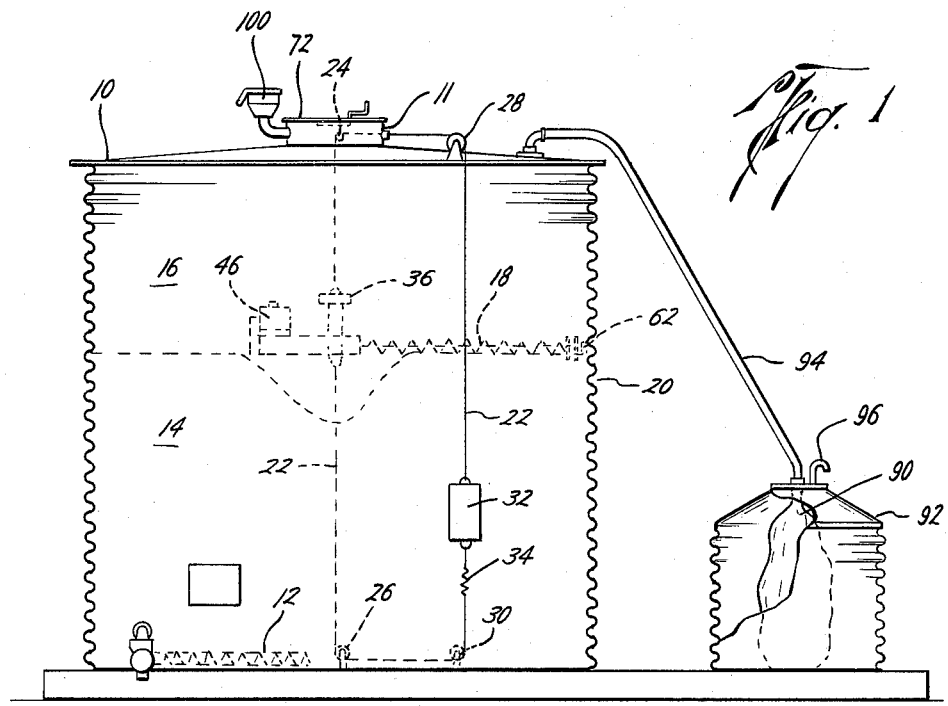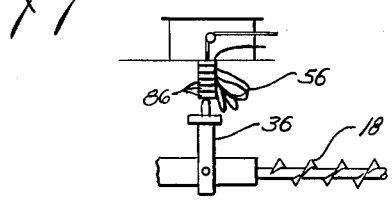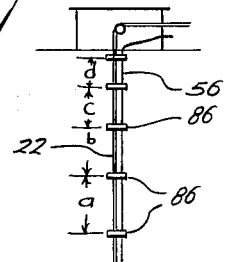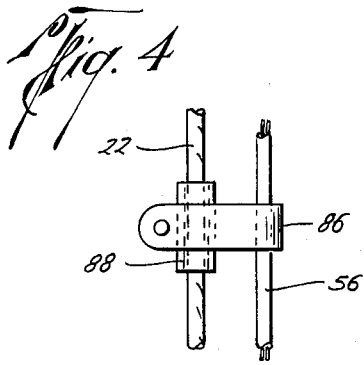
Marinus W. Van der Linde
Harold E. Manuel
INVENTORS

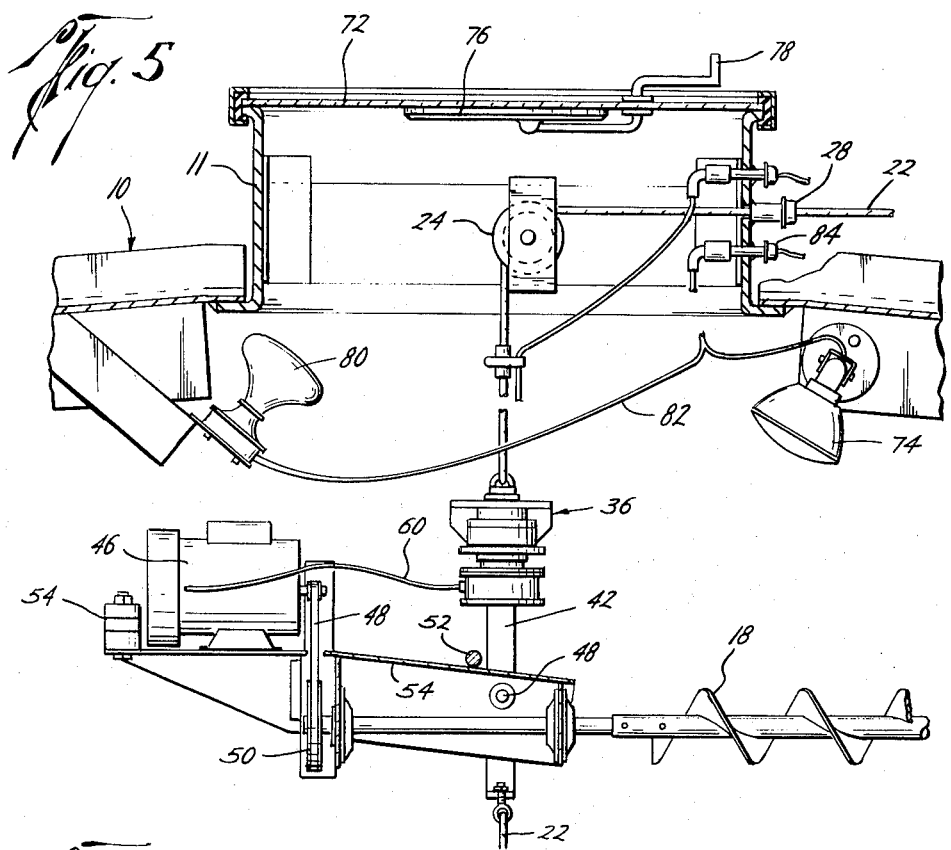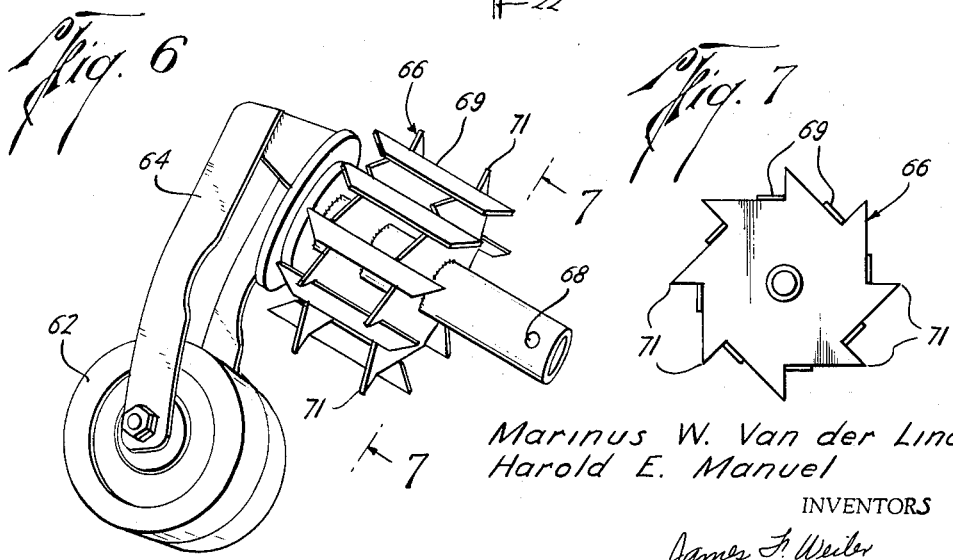

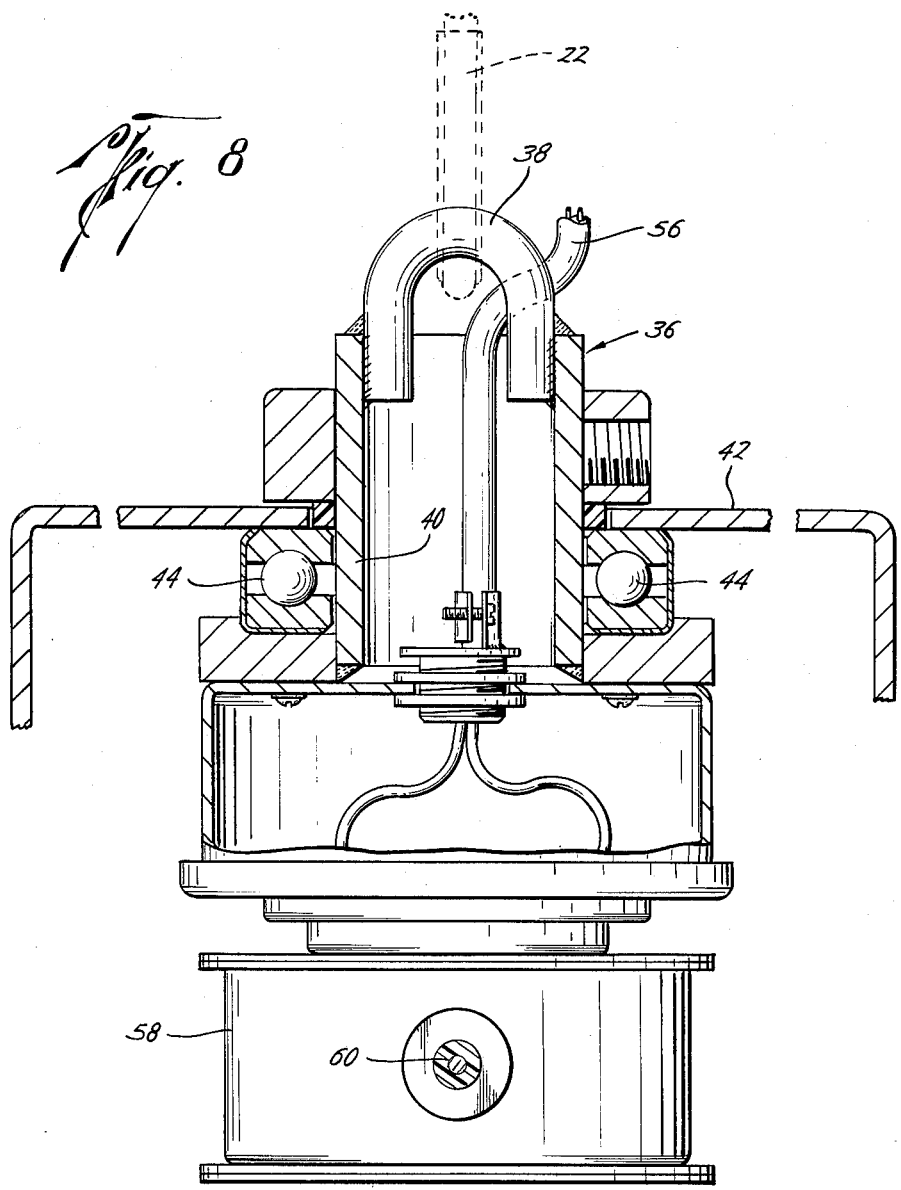

3,211,303
GRAIN STORAGE TANK AND UNLOADER
Marinus W. van der Linde and Harold E. Manuel, Kansas City, Mo., assignors to Black, Sivalls & Bryson, Inc., Kansas City, Mo., a corporation of Delaware
Filed Sept. 3, 1963, Ser. No. 305,949
8 Claims. (Cl. 214—17)

The present invention relates to a grain storage tank, and more particularly, relates to various improvements in such a tank.

Generally, in the storage of high moisture grain, the tank in which the grain is stored is made air tight in order to prevent spoilage. Immediately after the tank is filled with the grain such as corn, milo, or other suitable grain, all manhole covers and inspection doors are sealed. The oxygen in the air sealed in the tank, and which is both in the space between the top of the tank and the surface of the grain, and also in the voids between the grain is converted into carbon dioxide gas by fermentation of the grain itself. This carbon dioxide preserves the grain and will prevent unnecessary fermentation. However, it is important that the tank remain substantially air tight to prevent additional air from reaching and spoiling the grain. Generally, an unloading conveyor, such as auger, is located in the bottom of the tank and draws the grain for feeding from the center of the tank floor to the outside of the tank. Thus, the tank need not be opened exposing the grain to air and a person need not enter the tank and be subjected to the dangerous carbon dioxide.

However, in withdrawing grain feed from the storage tank it has been found that the angle of repose in high moisture grain is sometimes as high as 90°. In other words, as the unloading auger continues drawing grain from the center of the bin an open space or a core develops in the center of the stored grain from the top to the bottom of the grain. Therefore, after this core is removed from the center of the storage tank the unloading auger or conveyor runs without delivering any more grain.

One feature of the present invention is the provision of a hanging sweep apparatus which is positioned on top of the grain inside of the tank and which draws grain towards the center of the tank and feeds the unloading conveyor at the bottom of the tank.

Another object of the present invention is the provision of a sweep auger which is suspended inside of the tank and which draws the grain towards the center and feeds an unloading conveyor when the auger is rotated in one direction, and which acts as a spreader to move the grain from the center of the tank outwardly towards the walls during loading of the tank. In addition, the sweep auger of the present invention rotates about the inside of the tank and keeps the grain surface level.

A further object of the present invention is the provision of a sweep conveyor suspended in a grain storage tank and which is positioned on top of the grain and is supported for vertical movement as the level of the grain in the tank decreases.

Yet a further object of the present invention is the provision of a sweep conveyor for use in a grain storage tank by providing a helical auger suspended for vertical movement inside of the grain tank and positioned generally horizontal and radially from the tank center, and includes means for rotating the auger which draws the grain from the tank walls toward the center of the tank for feeding and unloading the auger, and which moves circularly about the interior of the tank on top of the grain because of the rotation of the helical auger.

A still further object of the present invention is the provision of cutting means adjacent the outer end of a rotating auger which removes stuck or frozen grain from the interior walls of the tank as the auger rotates about the interior of the tank.

A still further object of the present invention is the provision of rotatable means on the outer end of a sweep auger which spaces the auger from the interior of the tank thereby protecting the tank coating.

A still further object of the present invention is the provision of a window in the top of a grain storage tank for observing the condition of the grain and the operation of the unloading auger which includes a windshield wiper contacting the window inside of the tank for removing moisture therefrom, and which may also include a heat lamp located adjacent the interior of the window for defrosting the window.

A further object of the present invention is the provision of a breathing system for a grain storage tank to reduce the amount of air drawn into the tank as temperature changes cause an expansion and contraction of the carbon dioxide inside of the tank, and which includes a flexible breather bag positioned outside of the tank and a conduit connected between the bag and the tank adjacent the top of the tank.

A still further object of the present invention is the provision of a breathing system including a flexible breather bag positioned exterior of the tank, a protective housing about the tank, said housing being in communication with the atmosphere, and a conduit connected between the breather bag and the top of the tank and which may include a pressure-vacuum bag valve connected to the top of the tank.

Yet a still further object of the present invention is the provision of a sweep auger for use in a grain storage tank which is suspended from a continuous loop of cable which is vertically suspended interiorally of and adjacent the center of the tank and which rests on the top of grain and is provided with a counter weight on the cable on the outside of the tank so that the auger may move downwardly as the grain decreases, and a suitable means such as a motor is provided to rotate the auger and limiting means are provided to keep the auger in a substantially horizontal position for sweeping or feeding the top layer of grain to an unloading conveyor.

Other and further objects, features and advantages of the present invention will be apparent from the following description of a presently preferred embodiment of the invention, given for the purpose of disclosure and taken in conjunction with the accompanying drawings, where like character references designate like parts throughout the several views, and where, FIGURE 1 is an elevational view, partly in cross-section, of the apparatus of the present invention, FIGURE 2 is a fragmentary schematic view showing the operation of the electrical control cable as the sweep mechanism of the present invention is in an elevated position, FIGURE 3 is a fragmentary schematic view showing the positioning of the electrical control cable as the sweep mechanism of the present invention is in a lowered position, FIGURE 4 is a fragmentary elevational view illustrating the details of supporting the electrical control cable from the suspension cable, FIGURE 5 is a fragmentary elevational view, in cross-section, of certain features of the present invention, FIGURE 6 is an enlarged prospective view of the outer end of the sweep mechanism of the present invention showing the cutter means for removing stuck grain from the interior wall of the storage tank and showing a rotatable means for protecting the tank lining.

FIGURE 7 is a cross-sectional view taken along the line 7—7 of FIGURE 6, and

FIGURE 8 is an enlarged elevational view, in cross-section, illustrating the yoke for supporting the sweep mechanism.

Referring now to the drawings, and particularly to FIGURE 1, a high moisture grain storage tank is generally indicated by the numeral 10 is shown. A conventional unloading auger 12 is provided in the bottom of the tank which draws grain from the center of the tank floor for feeding purposes as the grain is needed. However, because of the characteristics of the high moisture grain 14 the unloading auger 12 frequently runs without delivering the needed feed. That is, a crater or open core develops in the center of the grain from the top to the bottom of the tank as the unloading auger 12 removes grain and because of the high moisture content of the grain the grain will not slide into this hole or crater and feed the unloading auger 12. Because the interior of the tank 10 is filled with carbon dioxide it is not safe for a person to enter into the tank and feed grain into the crater. In addition, it is undesirable to open the tank as additional air would flow into the tank space 16 causing deterioration of the grain 14. One feature of the present invention is to provide a sweep mechanism to flow grain to the unloading auger 12.

Referring now to FIGURES 1 and 5, a suitable sweep or conveyor means such as helical auger 18 is provided suspended from the interior of the tank and on top of the grain. The sweep auger 18 is generally positioned horizontally and extends radially from the center of the tank outwardly to the inside of wall 20 of the tank 10. It is noted that as the auger is rotated in a clockwise direction about its axis that the grain 14 on top is drawn from the tank walls 20 towards the center of the tank for feeding the unloading auger 12. In addition, it is noted that as the auger 18 is rotated in a clockwise direction about its axis it will also travel in a circular and clockwise direction around the tank by virtue of the action of the helical auger 18 against the top of the grain. This will also tend to keep the grain surface level. Of course, if the auger is rotated in a counter clockwise direction about its axis it will tend to move grain from the center of the tank outwardly. This latter operation is particularly useful in spreading the grain into the tank 10 during loading of the tank with grain.

The sweep 18 is suspended in the tank 10 for rotative movement about the center of the tank and for vertical movement in the tank. Preferably, the auger 18 is supported from a cable 22 which extends through the center of the tank 20 passes around suitable pulleys 24 and 26 to the outside of the tank through suitable packing glands such as 28 (FIGURE 5) to form an air tight seal and forms a continuous loop outside of the tank around pulleys 28 and 30. Thus, the continuous loop of cable 22 will suspend the sweep 18 inside of the tank 10, will properly center the sweep 18 in the tank, and will provide a vertical guide for moving the sweep 18 vertically in the tank. A counter weight 32 is connected to the cable 22 of such a weight so that the auger 18 will rest lightly on the top of the grain 14 but will move downwardly as the amount of grain in the tank decreases. In addition, a spring 34 is connected in the cable loop 22 to take up any differential in the height of the tank as the tank 10 is generally formed of corrugated walls 20 which will cause the tank to vary in height depending upon the grain content of the tank.

A supporting yoke 36 (FIGURES 5 and 8) may provide the actual connection of the sweep 18 to the cable 22. The yoke 36 is suspended from the cable 22 by a lifting lug 38 which in turn supports the body 40 of the yoke. A carrying bracket 42 is rotatably suspended from the yoke body 40 on suitable bearings 44 in order that there may be relative rotational movement between the bracket 42 and the yoke 36. The sweep 18 and suitable driving means such as an electric motor 46 are preferably pivotably suspended by a pivot pin 48 from the brackets 42. The motor 46 may be connected through belt 48 and pulley 50 drive to provide the rotative movement of the helical auger sweep 18. A stop limiting shoulder 52 is provided connected to a supporting mounting 54 which will limit the horizontal pivoting movement of the motor 46 and auger 18 about the pivot pin 48. This limiting shoulder 52 is provided so that the auger 18 will remain in a generally horizontally direction on top of the grain for proper operation. The stop shoulder 52 prevents the auger from burrowing itself vertically into the grain 14 and thus from performing its intended function. The motor 46 and any necessary counterweights 54 are provided opposite the auger 18 to counterbalance the auger around the pivot pin 48 and to act to maintain the auger 18 in a generally horizontal position.

Referring again to FIGURE 5, the supporting cable 22 is connected to the bottom of the hangers 42 thus keeping the yoke 36 and thus the sweep 18 centered in the tank.

Referring now to FIGURE 6, the mechanism at the end of the auger 18 is best seen. A suitable rotatable means such as a soft rubber wheel 62 is pivotably mounted on a support 64 for connection to the sweep 18. Thus, as the sweep rotates about the interior of the sidewalls 20 of the tank 10 (FIGURE 1) the rubber wheels 62 will contact the wall and protect the wall and any lining thereon from the sweep 18. Generally, as the walls 20 of the tank are corrugated it is preferable that the width of the wheels 62 be sufficient to extend across a complete corrugation section in order not to become caught and vertically held in a "valley" of the corrugated walls. It has also been found that the high moisture grain in some cases tend to stick to the sidewalls 20 and in addition at freezing temperatures the high moisture grain will freeze to the walls. Therefore, a cutter or chopper 66 is provided for connection to the outer end of the sweep 18 by a suitable connection such as hole 68 and a connecting pin (not shown). Thus, the cutter 66 will rotate with the auger 18 to cut or chop grain from the side walls 20 of the tank. The chopper 66 may include suitable blades 69 and be supported by end supports 70 which include chipping points 71 to break frozen grain formations.

As previously mentioned the tank 10 must remain closed to limit contamination of the grain from outside air and also to eliminate the danger of exposing anyone to the carbon dioxide in the space 16. However, referring to FIGURE 5, in order to make a visual determination, both as the condition of the grain 14 in the tank and as to the performance of the sweep 18 a suitable window 72 is provided in the dome 11 of the tank 10 and a floodlight 74 may be provided if necessary for adequate visibility. Because of the high moisture inside the tank, a windshield wiper 76 is provided on the inside of the window 72 which may be operated outside of the tank by means of a suitable handle 78 extending to the outside. Thus, any condensate on the interior of the window 72 may be removed so that the inside of the tank may be inspected. In addition, in the winter time, it frequently happens that the condensate on the inside of the window 72 will freeze up thereby rendering the operation of the wiper 76 useless. Therefore, a heat lamp 80 may be provided on the inside of the tank 10 which is directed against the interior of the window 72 to melt and defrost any frozen condensate. Suitable electric leads from the lamp 74 and 80 are provided through electrical leads 82 which extend through the tank 10 through a suitable stuffing box 84.

Referring now to FIGURES 2, 3 and 4, it is noted that the electrical cable 56, which provides the electrical current for the motor 46 which rotates the auger 18, is connected to and supported from the suspension cable 22 inside of the tank. The cable 56, referring specifically to FIGURE 4, is supported by suitable clamps 86 from the suspension cable 22 by sleeves 88 which are freely slidable over the cable 22. Thus, as the sweep 18 moves vertically in the tank 10 the electrical cable 56 may be formed in suitable loops to prevent entanglement of the electrical line 56 in the sweep auger 18, but yet allow full extension of the electrical cable 56 when the auger is in a bottom position as shown in FIGURE 3. That is, the sleeves 88 will slide along cable 22 and will contact the top of the yoke 36 and the next lower adjacent sleeve as the sweep 18 is raised upwardly thereby forming the electrical cable 56 into suitable loops as shown in FIGURE 2 to prevent entanglement in the sweep 18. Preferably, it is desired that the clamps 86 be spaced at varying intervals with the longer intervals being at the bottom. That is, referring to FIGURE 3, the interval $a$ is larger than $b$, $b$ is larger than $c$ and so forth. Such spacing is desirable as this insures that the upper loops cannot entwine a next lower loop and thereby prevent the lowering of the auger 18 in the tank.

Referring again to FIGURE 1 and as previously mentioned, after the feed is stored in the tank 10 all openings are sealed in order to insure that the tank is air tight to prevent spoilage of the grain. The initial air in the space 16 is converted into carbon dioxide by fermentation of the grain and this carbon dioxide preserves the grain and is necessary to prevent further spoilage. However, because of the expansion of gases, which will occur by temperature changes, a breathing system is provided to relieve the pressure changes in the air tight tank 10, but at the same time conserving the carbon dioxide and preventing air from being periodically introduced into the tank 10. Thus, a flexible breather bag 90 is provided which may be suitably enclosed in a protective housing 92 and the bag is connected with the gas in the tank 10 by means of an suitable conduit 94. The enclosure 92 supports and protects the bag at all time from puncture. When the bag is inflated and thus under pressure it can fill the enclosure 92 completely and is thus supported all around. An air vent or gooseneck 96 is provided in the housing 92 to admit and exhaust air from the housing 92 as the breathing bag 90 is alternately expanded and contracted on the occurrence of temperature changes. Thus, when the ambient temperature drops, which usually occurs during the night, a pressure reduction will place the excess carbon dioxide which has filled the plastic lung in the daytime and thus conserved will return to the tank 10. Because of the expansion of gases, which will occur on temperature rise on hot days, the carbon dioxide is channeled through the conduit 94 to the breather bag 90 and is thus stored and preserved and does not escape to the atmosphere. Thus, the excess carbon dioxide may be returned to the tank and thus prevent breathing of air into and from the tank which would be detrimental to the grain. Generally, the plastic bag 90 is sized to hold an ample amount of carbon dioxide to provide for a permanent blanket on top of the grain surface under normal circumstances. In the event that the pressure in the tank exceeds the accepted safety range, a vacuum-pressure valve 100 is provided to allow superflous gas to escape and enter. While the entry of some air through this safety valve may occur, it is noted that the valve 100 is mounted on the highest point of the tank and thus any oxygen entering would be nearer the top the oxygen will stay near the top because the carbon dioxide is heavier than the oxygen. Even in the event of air entering and encountering the top of the grain 14, which would be then subject to fermentation and deterioration, the suspended sweep auger 18 provides the advantage that it will draw the top level of grain and deliver it to the unloading auger 12 so that the contacted grain will be the first removed from the tank 10 thereby reducing the chance of spoilage.

In use, the yoke 36 and thus the sweep 18 and motor 46 are raised adjacent the top of the grain storage tank 10 at the time of filling the tank. Thus, the sweep 18 will be above the top level of the grain 14 when the tank 10 is being filled. At this time the grain, which is filled throuhg the dome 11, is unlevel with a peak or mound in the center of the tank 10. The sweep 18 may then be actuated by suitable electrical controls (not shown) to rotate in reverse, and thus rotate counter clockwise about its axis and also circle the tank in a counter clockwise movement to level the grain therein by moving it from the inside peak toward the outer walls 20 of the tank 10. Thus, when the sweep 18 is rotated in reverse it acts as a spreader during the loading of the tank. Prior to closing and securing all of the openings in the tank 10 the position of the flexible breather bag 90 should be set. That is, if the grain loading is done at the time that the temperature is at a maximum, the breather bag 90 should be placed in a normal expanded position prior to securing all of the air tight openings in the tank. This will allow contraction of the gas in the space 16 when the temperatures decrease. On the other hand if the temperatures are relatively low, the breather bag 90 should be collapsed prior to closing the air tight openings in order to allow expansion of the gas from the space 16.

As has previously been mentioned, the oxygen in the air in the space 16 is converted into carbon dioxide gas by fermentation of the grain 14. While this carbon dioxide preserves the grain, the tank must be kept air tight in order to prevent loss of this carbon dioxide and thus the entry of additional air which will cause spoilage of the grain. In addition, the tank is further kept closed to eliminate the danger of exposing personnel to the carbon dioxide.

As previously mentioned, the unloading conveyor or auger 12, which is conventional, periodically such as daily, draws grain from the storage tank 10 from the center of the tank floor. However, because of the characteristic of high moisture grain, as the grain is drawn from the tank a crater or core is formed in the grain 14. That is, an open space is then made above the withdrawing end of the auger 12, after which the unloading auger runs without delivering the needed grain.

The sweep 18 may be operated by actuating the electrical drive motor 46 by suitable electrical controls (not shown) to rotate the sweep in a clockwise direction which causes it to draw grain on top from the tank walls 20 towards the center of the tank and into the crater or core thereby feeding the unloading auger 18. Because of the rotating action of the sweep auger 18 contacting the grain, it will travel in a circular path about the top of the grain 14 and thereby keep the grain surface level. A roller 62 (FIGURE 6) may be provided at the outer end of the sweep auger 18 to contact and space the auger from the interior walls 20 of the tank 10 thereby protecting any protective coat on the tank walls. The auger 18 is suspended from a continuous cable loop 18 which is suitably held in place by pulleys so that the inner end of the sweep 18 is positioned in the center of the tank 10. Preferably, a yoke 36 provides the actual support for the sweep auger 18. The drive motor 46 and its connecting drive, all of which is pivotally supported by pivot pin 48 are supported by brackets 42 from the yoke 36 and act to counterbalance the auger 18. In addition to the motor 46, counter weights 54 may be provided to suitably balance the sweep 18 so that it may maintain a substantially horizontal position on top of the grain 14. Furthermore, a limiting stop shoulder 54 is provided which will limit the amount of deviation from the horizontal of the sweep auger 18 so that it cannot bury itself and become stuck in one position of the grain.

Referring again to FIGURE 1, it is noted that a counter weight 32 is suspended in the cable loop 22 on the outside of the tank and is of a weight slightly lighter than the yoke 36, motor 46 and sweep 18 so that the sweep auger 18 will rest on top of the grain 14, but will move downwardly as the amount of grain 14 in the tank decreases.

In addition, a spring 44 is provided in the cable loop 22 in order to take up differential in the tank as tanks with corrugated walls such as shown vary in height depending upon the amount of grain filling the tank. It is also to be noted that the counter weight 32 or any other indication on the cable loop on the exterior of the tank 10 serves as a level indicator as the grain level in the tank 10.

However, if it is desired to make a visual inspection into the tank to determine either the condition of the grain therein or the proper operation of the sweep auger 18, the window 72 (FIGURE 5) is provided atop the tank 10 and a floodlight 74 may also be provided to provide sufficient light directed into the interior of the tank. Because the moisture content inside of the tank may be high and condensate formed on the interior of the window 74, a manual windshield wiper 76 is provided adjacent the interior of the window which may be operated outside of the tank by a suitable manual operating lever 78. In addition, in the winter time the condensate may freeze on the window 72. A heat lamp 80 may then be provided which may be suitably operated by a conventional electrical switch (not shown) to defrost the interior of the window 72. Thus, the condition of the grain and sweep auger may be observed without subjecting anyone to the dangerous carbon dioxide gas and without opening the tank which would result in the admission of air into the tank. Also, by manual movement of the cable 22 the vertical position of the sweep auger 18 may be suitably adjusted or positioned, if necessary.

Referring now to FIGURES 6 and 7, the grain may stick to the sidewalls of the tank or freeze thereto in cold weather. Therefore, a cutter or chopper 66 is provided connected to the outer end of the auger 18 to cut or chop away the grain from the sides of the walls of the tank as the sweep 18 is rotated about the tank. The blades 69 rotate with the auger 18 to cut away the grain and provide a path for the wheel 62 adjacent the interior side walls. In addition, the sharp points 71 on the blade supports 66 also provide a sharp picking or cutting action.

Referring now to FIGURE 8, it is noted that the yoke is connected to the loop cable 22 and by means of a pivoted bracket 42 allows the rotation of the motor 46 and sweep auger 18 about the interior of the tank. A conventional electrical slip ring connection 58 is provided to prevent twisting up of the electrical cables 56.

Referring now to FIGURES 2, 3 and 4, suitable support is provided for the electrical motor cable 56 to prevent it from becoming caught in sweep 18 as the sweep 18 is moved in a vertical direction. As shown in FIGURE 4, the clamps 86 which are connected to the electrical cable 56 support the cable and allow it to slide up and down the cable loop 22 by virtue of the slidable sleeves 88. The sleeves 88 will engage the top of the yoke 36 as shown in FIGURE 2 to form the electrical cable 56 in loops between the sleeves 88 as the yoke and auger 18 are raised thereby preventing entanglement of the electrical cable in the auger 18.

To prevent the loops from becoming entangled among themselves, such that an upper loop will entwine a lower loop and thereby prevent the lowering of the yoke 36 and auger 18, the fastening clamps 86 are secured to the electrical cable 56 at varying intervals. Referring to FIGURE 3, the interval $a$ is smaller than $b$, $b$ is smaller than $c$ and so forth. Thus, when the auger 18 is in the upper position as shown in FIGURE 2 the loop $a$ since it will be smaller than the loop $b$ cannot encircle and prevent loop $b$ from extending downwardly.

Referring again to FIGURE 1, during the expansion of the gas in the space 16 in tank 10, which will occur on a temperature rise such as on hot days, the carbon dioxide in the tank is channeled through a conduit 94 to the flexible breathing bag 90 which will preserve and hold the carbon dioxide until it is again needed. The housing 92 protects the breathing bag 90 and the housing vent 96 allows the expansion and contraction of the bag 90 inside of the housing 92. When the ambient temperature drops, which usually occurs during the night, a pressure reduction will take place and the excess carbon dioxide, which is preserved in the breathing bag 90, can then be returned to the tank 10 and is thus used to prevent spoilage of the grain 14. This breathing system prevents the loss of the carbon dioxide as the temperature rises and provides a source of carbon dioxide as the temperature decreases thereby avoiding breathing air into the tank, which could result in a spoilage of the grain. In the event that the pressure in the tank exceeds the accepted safety range, a conventional vacuum-pressure valve 100 is provided which will open to allow the tank to breathe through the atmosphere or back if necessary. The auger 18 will cooperate with the breathing system to prevent spoilage of the grain 14, even in the event that air enters the tank. That is, any air that may enter the tank will encounter and first attack the top layer of the grain. However, since the sweep auger 18 will unload the top layer of the grain first, any grain subject to further fermentation will be removed from the tank 10 first and before it has a chance to spoil.

The present invention, therefore, is well suited and adapted to attain the ends and advantages mentioned herein as well as others inherent therein.

While a presently preferred embodiment of the invention is given for the purpose of disclosure, numerous changes in the details of construction and arrangement of parts may be made which are within the spirit of the invention and the scope of the appended claims.

What is claimed is:
1. A sweep auger for use in a grain storage tank comprising,
   a continuous cable movingly supported from said tank, said cable being vertically suspended interiorly of and adjacent the center of the tank and extending out of the tank adjacent the tank and bottom and along the outside of the tank thereby providing a vertical support and guide along the vertical axis of the tank,
   An auger suspended interiorly of said tank on said cable and positioned generally horizontally and radially extending from the cable,
   means connected to and rotating said auger,
   rotatable means on the outer end of said auger spacing and protecting the interior of the tank from the rotating auger,
   a counterweight connected to said cable outside of said tank, said weight being sized to allow the auger to move downwardly as the amount of grain in the tank is decreased.
2. The invention of claim 1 including,
   a spring in said cable allowing for vertically expansion of said tank.
3. The invention of claim 1 wherein the means rotating said auger includes,
   an electrical motor suspended from the cable, and counterbalancing said auger,
   said motor and auger being pivotly supported about a horizontal axis, and
   means limiting deviation from horizontal of the auger.
4. The invention of claim 1 including,
   a rotary cutter connected adjacent the outer end of said auger for removing grain from the interior walls of the tank as the auger is rotated.
5. The invention of claim 1 including,
   a window in the top of the tank,
   a windshield wiper contacting the window interiorly of the tank,
   a windshield actuating mechanism connected to the wiper and extending exteriorly of the tank for operating the wiper outside of the tank, and
   a heat lamp disposed adjacent said window inside of said tank for defrosting the window.
6. The invention of claim 1 including, a flexible breather bag positioned exteriorly of said tank,
a protective housing about the bag,
said housing including an opening to the atmosphere, and
a conduit extending from said bag to the top of the tank.

7. The invention of claim 1 wherein the rotating means is reversible for assisting in either filling or emptying said tank.

8. The apparatus of claim 3 including,
an electrical supply line leading from the top of the tank to the electrical motor,
a plurality of supporting clamps connected to the electrical line and slidably supported from the cable,
said clamps being progressively spaced closer together from the bottom of said line towards the top of said line to insure that when the motor is adjacent the upper portion of the tank the electrical line will form loops between the clamps with the upper loops being progressively smaller when the next adjacent lower loop.

References Cited by the Examiner
UNITED STATES PATENTS

| | | | |
|---|---|---|---|
| 1,645,935 | 10/27 | Schei | 222—156 X |
| 1,834,372 | 12/31 | Askam. | |
| 2,430,203 | 11/47 | Bailey | 214—17 |
| 2,500,043 | 3/50 | Radtke | 214—17 X |
| 2,643,602 | 6/53 | Martin. | |
| 2,680,874 | 6/54 | Mitchell | 15—250.31 |
| 2,735,591 | 2/56 | Branchflower | 214—17 X |
| 2,895,626 | 7/59 | Bier | 214—17 |
| 2,899,884 | 8/59 | Herbruck. | |
| 2,963,181 | 12/60 | Hinkle | 214—17 |
| 3,129,828 | 4/64 | Lusk | 214—17 |

GERALD M. FORLENZA, *Primary Examiner.*

HUGO O. SCHULZ, *Examiner.*